US008800380B2

(12) United States Patent
Todd, IV

(10) Patent No.: US 8,800,380 B2
(45) Date of Patent: Aug. 12, 2014

(54) TENSION MONITORING APPARATUS

(75) Inventor: Harry William Todd, IV, Midland, TX (US)

(73) Assignee: Tomcat USA, Inc., Midland, TX (US)

( * ) Notice: Subject to any disclaimer, the term of this patent is extended or adjusted under 35 U.S.C. 154(b) by 197 days.

(21) Appl. No.: 13/431,733

(22) Filed: Mar. 27, 2012

(65) Prior Publication Data
US 2013/0255392 A1   Oct. 3, 2013

(51) Int. Cl.
*F16B 31/02* (2006.01)
(52) U.S. Cl.
USPC ............................................. 73/761; 73/785
(58) Field of Classification Search
CPC ............... G01L 5/04; G01L 5/00; G01L 5/06; G01L 5/047; G01L 1/04; B60P 7/06; B60P 7/0861
USPC .......... 73/761, 788, 1.79, 818, 846, 856, 860, 73/785
See application file for complete search history.

(56) References Cited

U.S. PATENT DOCUMENTS

| | | | | |
|---|---|---|---|---|
| 1,020,748 | A * | 3/1912 | Dobson | 73/862.42 |
| 1,277,874 | A * | 9/1918 | Crowell | 73/862.472 |
| 2,385,052 | A * | 9/1945 | Birk et al. | 73/167 |
| 2,570,321 | A * | 10/1951 | Christoffer | 73/862.391 |
| 6,847,290 | B2 * | 1/2005 | Tardif | 340/440 |
| 7,093,327 | B2 * | 8/2006 | Huang | 24/68 CD |
| 7,823,466 | B2 * | 11/2010 | Glass | 73/862.392 |

FOREIGN PATENT DOCUMENTS

DE    3248789 A1 *  7/1984

OTHER PUBLICATIONS

Machine Translation of DE3248789 Bibliographic data and Description, Title: Load Indicator Device, Date: Jul. 12, 1984, Publisher: Espacenet, European Patent Office, pp. 7.*

* cited by examiner

*Primary Examiner* — Lisa Caputo
*Assistant Examiner* — Roger Hernandez-Prewit
(74) *Attorney, Agent, or Firm* — Slater & Matsil, L.L.P.

(57) ABSTRACT

A tension monitoring assembly or device permanently installed between a connection or anchor point and a guy cable line or structural rod allows constant monitoring and increase confidence that the guy cable or structural tension rod remains tensioned to the proper value. The device includes a plurality of compression members and a connecting member that are arranged between connection points such that the tension between a first connecting point and a second connection point may be set to a selected value. The tension on the device is determined by the distance between two members of the device such that a change in the tension from a set amount will result in a change of the distance between the two members. This change in distance can be determined by indicia that are visible as the two members move with respect to each other.

20 Claims, 8 Drawing Sheets

TENSION MONITORING APPARATUS

TECHNICAL FIELD

This invention relates generally to a tension monitoring apparatus.

BACKGROUND

Temporary roof systems have been used in the entertainment business for many years. These systems, however, are not immune to a dangerous collapse as was experienced a few years ago at the Indiana State Fair. These prior art temporary roof systems are typically anchored to the ground with a series of guy cables that run from the in place roof position to an anchor/ballast point. Although the instructions and engineering reports that are provided with the lighting and or staging platforms and systems require that all guy cables and structural rods should be pre-tensioned to a set value depending on the requirements for each location, one of the more difficult issues that must be handled, is how to properly set the pre-tension, and perhaps even more importantly is how to be sure that the pretension is maintained once properly set. Most techniques for setting the pretension use electronic devices that are put between the tension cable or structural tension rod and the anchor or connection point during assembly or set up. The tension in the cable or structural rod is properly set, and then the device is removed. A major problem with this technique is that once the tension is set, the tension must be removed before the measuring device can be removed.

SUMMARY OF THE INVENTION

Embodiments of the invention relate to the field of continually monitoring the tension on connecting cables and/or structural rods and, in particular embodiments, to monitoring the correct tension on such cables and rods used for staging and lighting platform trusses, support systems and structures. For example, the apparatus of embodiments of the invention allows continuous monitoring of the tension without requiring disconnecting the cable or structural rod once the correct tension has been established on the structure. In addition, the tension monitoring device when used with cables and structural rods allows ease of assembly and disassembly of temporary platforms and staging used for performances and special events.

According to an embodiment of the present invention, a tension monitoring assembly or device, preferably made of aluminum or steel, is permanently installed between a connection or anchor point and the guy cable line or structural rod. The device will allow constant monitoring and increase confidence that the guy cable or structural tension rod has been tensioned to the proper value.

This feature will typically be accomplished by using connections such as back to back clevis connectors, back to back spade connectors or a clevis connector arranged back to back with a spade connector. It should be appreciated, of course, that any other suitable type of connector may also be used. The back to back connectors are linked or connected together by an arrangement of a connecting member such as a center pivot bolt and use one or more spring disks or washers that compress as a tensional load is applied. As the spring washers compress, there are indicia or other marks that are exposed as various amounts of tension are applied to the guy cable or structural tension rods. For example, typical graduated tension values represented by the indicia or marks may increase at between 250 lbs. and 500 lbs per mark. Of course, each mark may represent a different change in the applied tension that is either greater or less than these values.

The back to back connectors may also rotate with respect to each other to allow the cable or structural tension rod to rotate as the tension increases. The assembly or device is preferably left in place during the duration of use. Consequently, the tension can be continuously monitored by noting the exposed indicia or marks to assure that the cable remains at the correct tension during the entire time the temporary structure is in place.

In a more specific embodiment, a device continuously monitors the tension between first and a second connecting points, such as, for example only, a ground anchor and a support point on the platform and/or staging platform being assembled. The device comprises a first member having a first end attached to the first connecting point and a second member having a first end attached to the second connecting point.

The device also includes, at least one, and typically a plurality of compression members and a connecting member, such as a nut and bolt, for securing the first member to the second member. The compression member and the connecting member are arranged between the first member and the second member such that the tension between the first connecting point and the second connection point may be set to a selected value. Setting the tension may be accomplished by adjusting distance between the first and second connecting members to change the tension. The tension compresses the compression member and thereby changes the distance between the first end of the first member and the first end of the second member. For example, if a bolt and matching nut is used as the connecting member, once the device is in place the nut and bolt arrangement is tightened so as to compress the compression member until the proper tension is reached.

The tension on the device determines the distance between the two first ends of the first and second members. Therefore, a change in the tension from the set amount will result in a change of the distance from the first end of the first member and the first end of the second member. This change in distance can be determined by the number of indicia that are visible as the first and second members move with respect to each other.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
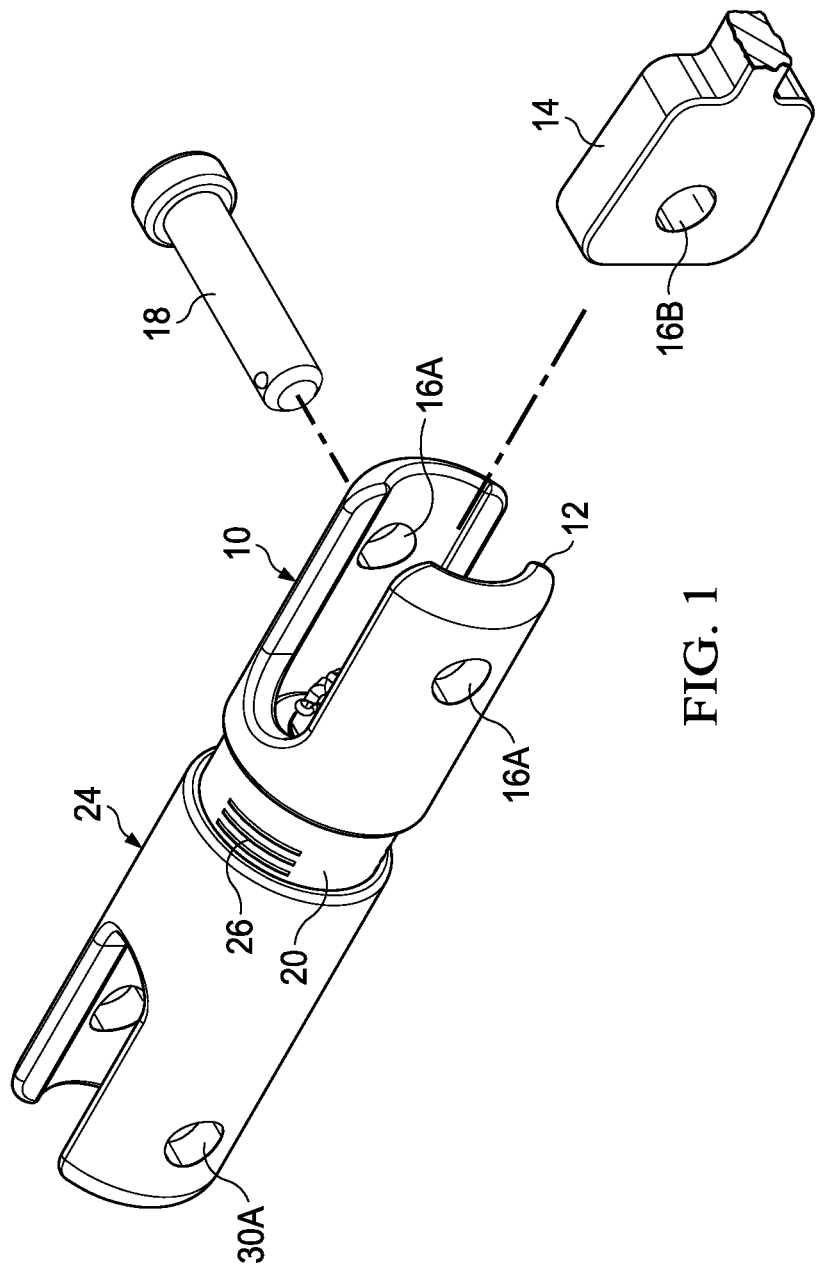
FIG. 1 is a perspective assembled view of a preferred embodiment of the tension monitoring device of the invention suitable for installing on a staging truss.
Figure 2:
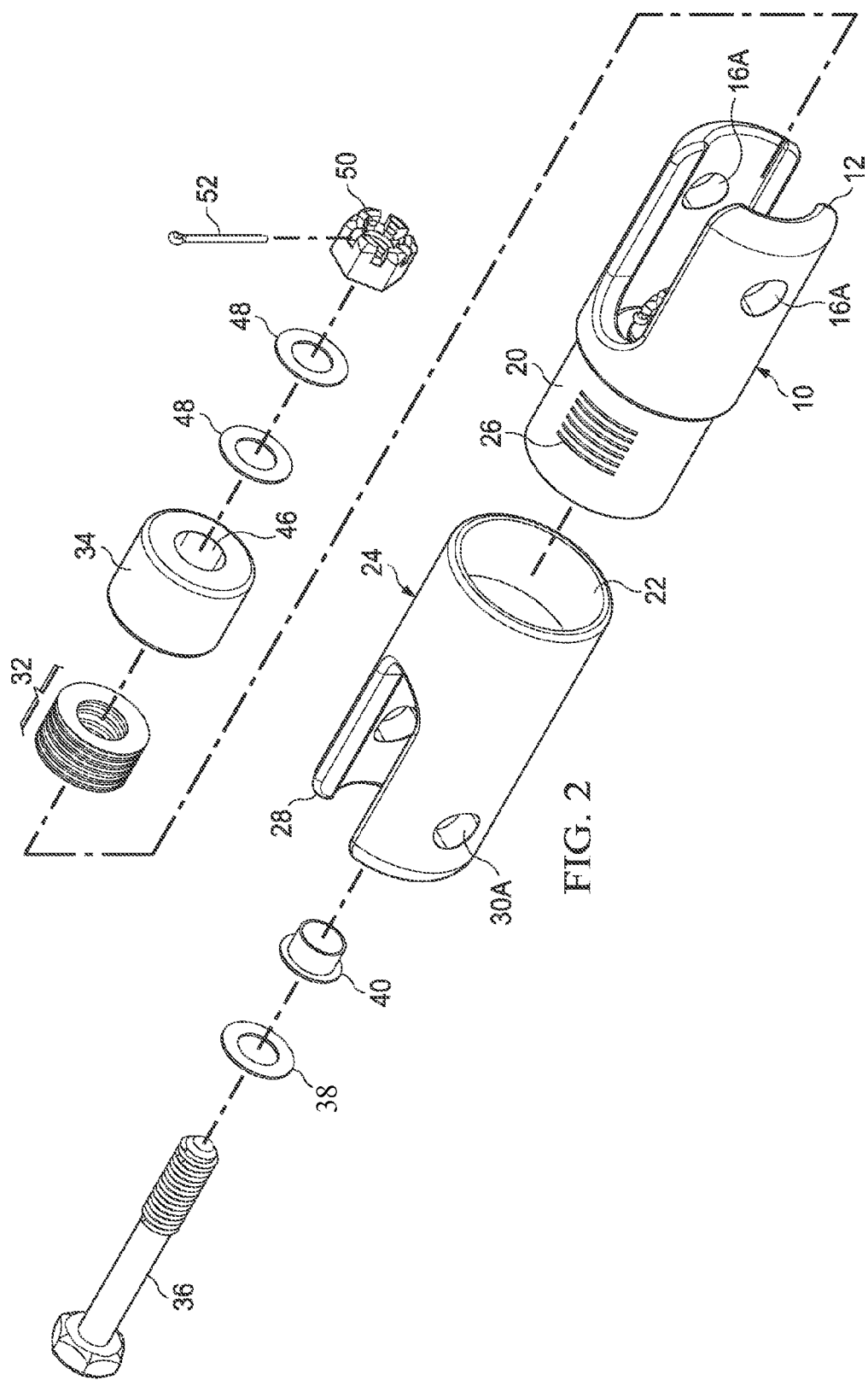
FIG. 2 is an exploded view of the device of FIG. 1.

FIGS. 1 and 2 show an assembled view and an exploded view of one embodiment of the tension monitoring device of the present invention. As shown in FIG. 1, the device includes a first member 10 having a "clevis" first end 12 for attaching to a first connecting point or structure such as a "spade" type device 14 that is in turn is connected to a cable or structural rod that will be in tension. As shown end 12 defines an aperture 16A, and the spade device 14 defines a similar aperture 16B such that when spade 14 is moved in to the clevis end 12, the clevis and the spade can be locked in place by a retaining pin 18 that is inserted through the two apertures 16A in the clevis and aperture 16B in the spade member.

At the end of first member 10 opposite the clevis end 12, there is a cylindrical projection 20, having a selected diameter that is received by an aperture 22 in a second member 24 that has a diameter just slightly greater than the diameter of the projection 20 such that there is a sliding fit between the cylindrical projection 20 of the first member 10 and the aperture 22 of the second member 24.

Figure 3A:
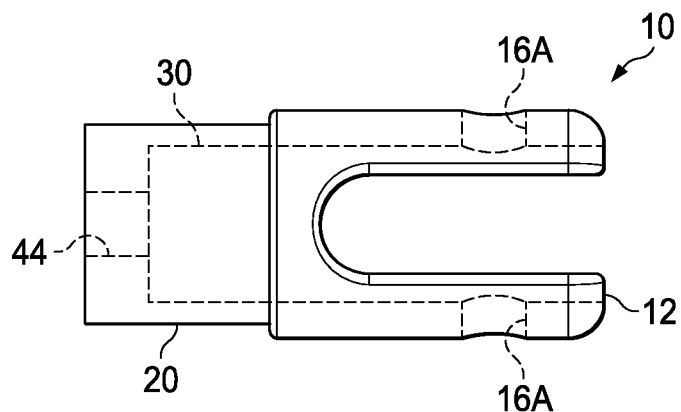
FIGS. 3A, 3B and 3C are plan, elevation and end views of the first member of the present invention.
Figure 3B:
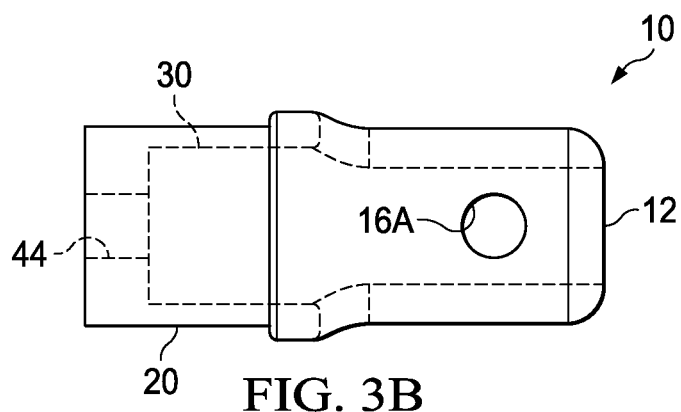
Figure 3C:
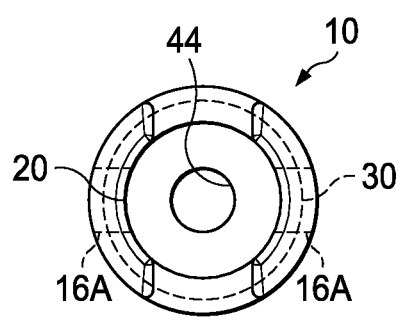
Figure 4A:
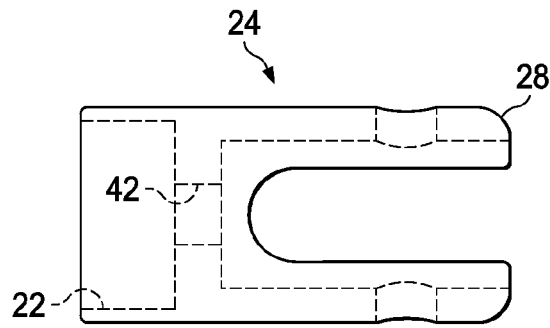
FIGS. 4A, 4B and 4C are top, plan and end views of a second member of the present invention.
Figure 4B:
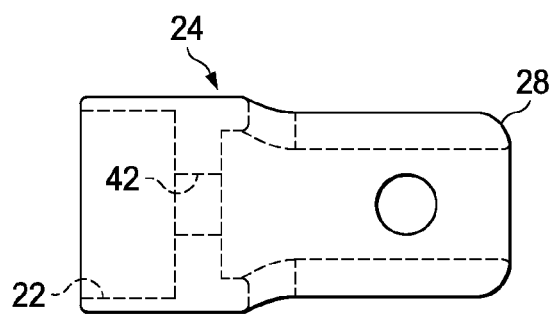
Figure 4C:
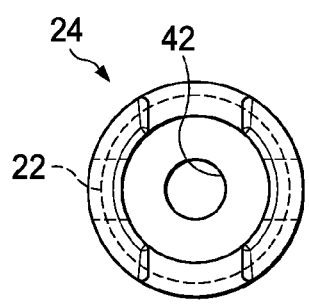

Plan, elevation and end views of first member 10 are shown in FIGS. 3A, 3B and 3C, and plan, elevation and end views of second member 24 are shown in FIGS. 4A, 4B and 4C. It is also noted that indicia marks 26 representative of the tension between the first member 10 and the second member 24 as will be discussed hereinafter, can be engraved or otherwise placed on the projection 20. Also as shown, in FIGS. 1 and 2, second member 24 also includes a clevis portion at its first end 28 with apertures 30A that can be connected to a spade member attached to a cable or structural rod under tension in the same manner discussed above with respect to the clevis and spade arrangement at the first end of member 10.

Thus, it will be appreciated that the device can be connected between two points of a structure arrangement that requires a specific tension to be maintained between the two. The remaining components comprising the embodiment of FIG. 1 of this invention are further illustrated and discussed in detail with respect to the exploded view of FIG. 2.

Referring now to the exploded view of FIG. 2 and the detailed views of the first member 10 shown in FIGS. 3A, 3B and 3C and the second member 24, shown in FIGS. 4A, 4B and 4C, it will be appreciated that components illustrated in FIGS. 2, 3 and 4 that are visible in FIG. 1 carry the same reference numbers. As shown in FIGS. 3A and 3B, first member 10 defines a cylindrical cavity 30 for receiving at least one compression member.

According to the embodiment of FIG. 2, instead of a single compression member a plurality of spring disks or washers 32 may be stacked together as the compression member. For example only, according to the embodiment shown in FIG. 2, seven spring disks 32 are stacked together. It will be appreciated, however, that the number and type of spring disks or washers may vary depending upon the required tension. It will also be appreciated that resilient devices other than spring disks or washers may be used.

Figure 5A:
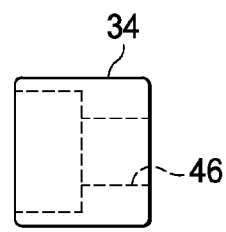
FIGS. 5A, 5B and 5C are elevation and end views of a spring bracket or third member of the present invention.
Figure 5B:
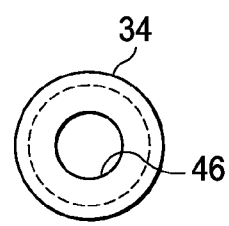

As shown in FIGS. 5A and 5B, spring bracket or capping member 34, has a cylindrical outside shape and also defines an inside cylindrical shaped cavity having a diameter large enough to fit over and protect the stack of spring disks 32. Also, of course, the diameter of cavity 30 defined in first member 10 must be greater than the diameter of the outside diameter of the spring bracket 34 to allow the spring bracket 34 to slide freely back and forth in cavity 30.

In the embodiment of FIG. 2, a bolt 36 holds the device together by extending through the components of the device in the following order. The bolt 36 extends through a washer 38, a flanged thrust bearing 40, an aperture 42 in second member 24, an aperture 44 in first member 10, the stack of spring disks 32, an aperture 46 in spring bracket 34 and at least one washer 48. Nut 50 receives the threaded end of bolt 36, and may be locked in place by a cotter key 52. Although, proper engineering practice may require the use of washers 38 and 48, cotter key 52 and thrust bearing 40, it will be appreciated that although advisable these items are not essential for the operation of the device. As an example, to avoid excess wear and abrasion damage, thrust bearing 40 should be used if members 24 and 10 are made of aluminum, and of course, washers are routinely used with nuts and bolts.

Figure 6A:
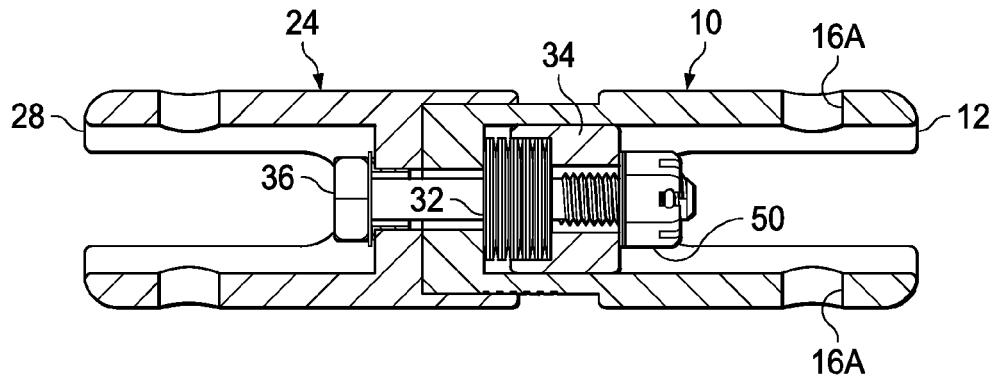
FIGS. 6A and 6B are "X-ray" plan, elevation and end assembled views of FIG. 1 of the present invention.
Figure 6B:
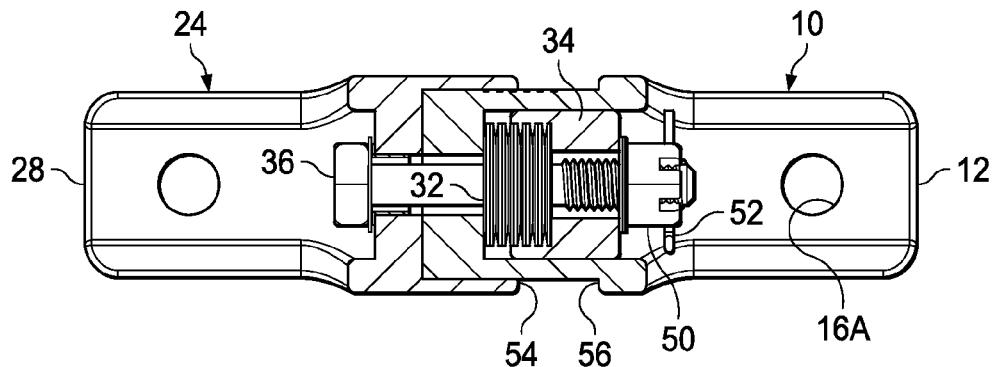

An "X-ray" view of the assembled device of FIG. 1 is illustrated in FIGS. 6A, 6B and 6C. From the FIGS. 6A and 6B, it can be seen that when the stack of spring disks 32 are in place, to allow full compression of the disks, the sides of spring bracket 32 must be short enough so that they cannot contact the bottom of the cavity 30. This allows the tension on the device to fully compress the spring disks. Thus, it can be seen that as the tension (T) increases the spring disks 32 are compressed and the edge 54 of the second member 24 moves away from the edge 56 of the first member 10. Thus, additional indicia or marks 26 on the projection 20 of first member 10 are uncovered. These marks can then be interpreted to determine the tension on the device.

Although not shown, it will be appreciated that the bolt and nut arrangement shown in FIG. 2 could be reversed with the head of bolt 36 located in member 10 and nut 50 located in member 24.

Figure 7:
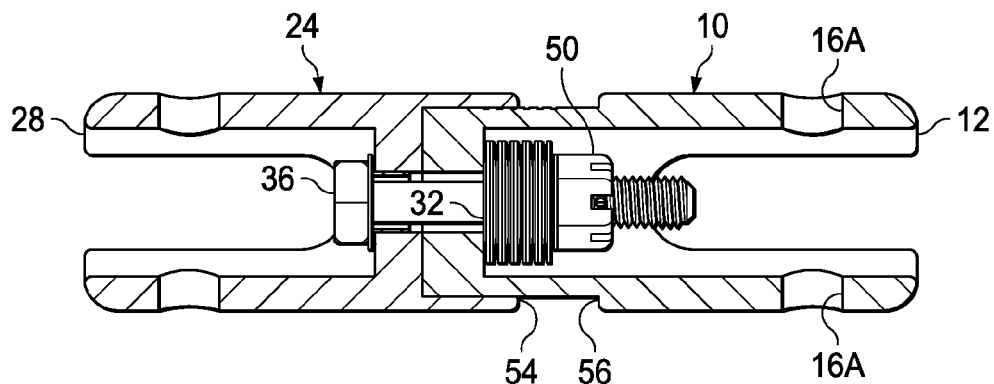
FIG. 7 is an "X-ray" plan view of an alternate embodiment of the invention without a spring bracket.

FIG. 7 illustrates another embodiment of the invention that does not use a spring bracket or capping member 34. More specifically, although it is preferable to use the spring bracket or capping member 34, it is not essential to the operation of the device.

Figure 5C:
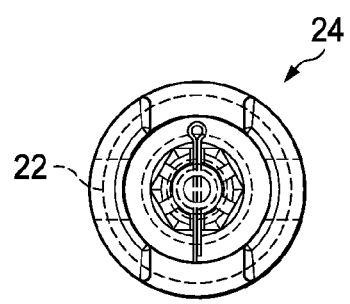
Figure 8A:
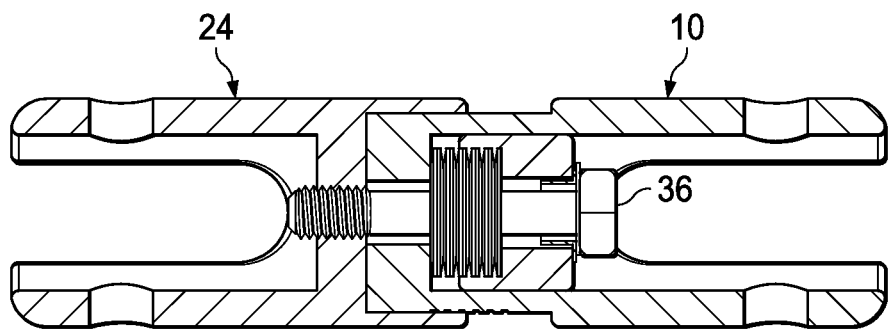
FIGS. 8A and 8B are "X-ray" plan and elevation views of an alternate embodiment of the invention wherein a drilled and tapped hole receives a connecting bolt.
Figure 8B:
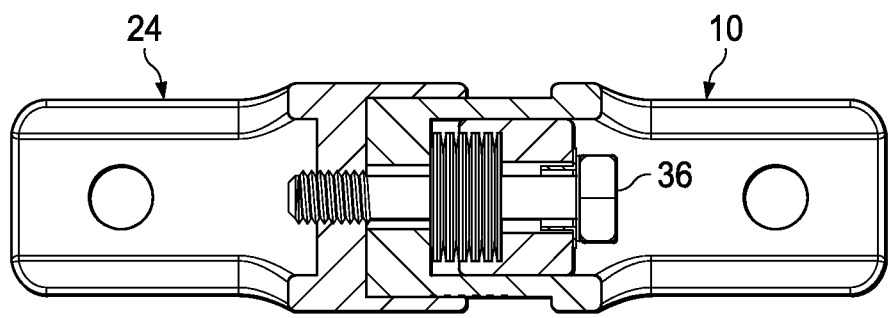

FIGS. 8A and 8B show still another embodiment of the invention. As shown, this embodiment is similar to that shown in FIGS. 5A, 5B and 5C, except that a nut 50 is not used and instead of a smooth hole, the aperture 42, in second member 24 is threaded to receive the threaded end of bolt 36. Alternately, but not shown the direction of bolt 36 could be reversed from that shown in FIGS. 8A and 8B, and instead of using a nut 50, the aperture 46 in spring bracket 34 is threaded to receive the threaded end of the bolt.

Figure 9A:
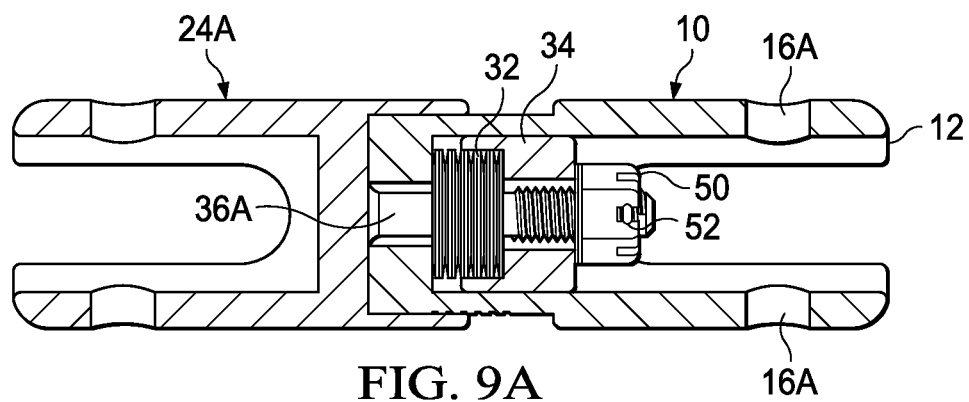
FIGS. 9A and 9B are "X-ray" plan and elevation views of an alternate embodiment of the invention that uses the threaded integral projection on the second member as the connecting member.
Figure 9B:
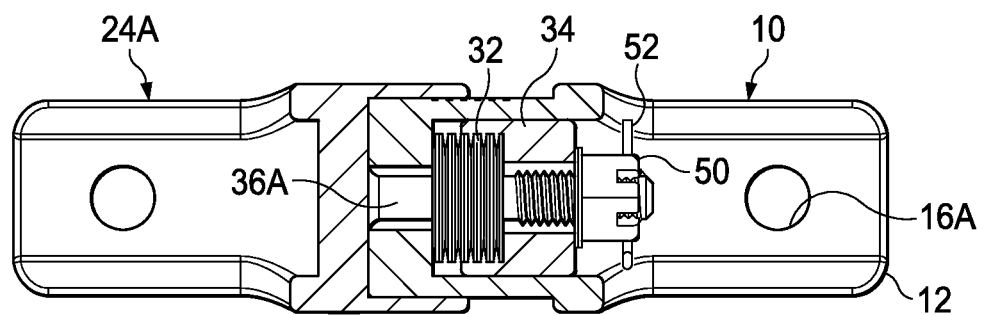
Figure 10A:
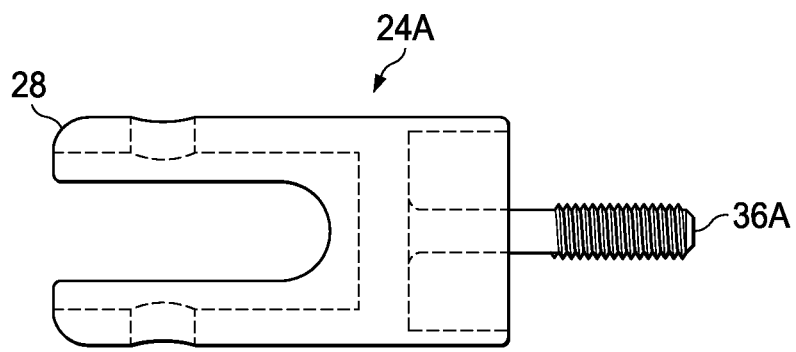
FIGS. 10A and 10B are plan and elevation views of an alternate embodiment of the second member that includes a threaded integral projection on the second member that cooperates with a matching nut as the connecting member.
Figure 10B:
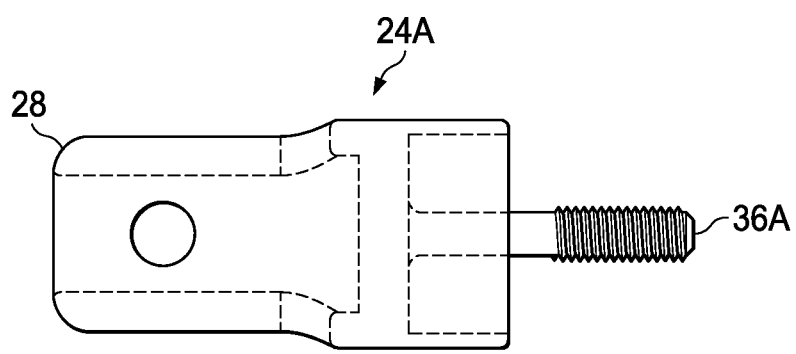

FIGS. 9A and 9B illustrate still another possible embodiment of the invention. This embodiment is similar to that shown in FIGS. 1, 2 and 6A, except there is no bolt 36 at all. According to this embodiment, the second member 24A is modified as clearly shown in FIGS. 10A and 10B to provide an integral elongated threaded projection 36A that replaces bolt 36. Threaded projection 36A operates similarly and is received by nut 50 in the same manner as bolt 36.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, devices or circuitry described in the specification. As one of ordinary skill in the art will readily appreciate from the disclosure of the present invention, devices presently existing or later to be developed, that perform substantially the same function or achieve substantially the same result as the corresponding embodiments described herein may be utilized according to the present invention. Accordingly, the appended claims are intended to include within their scope such embodiments and devices.

What is claimed is:

1. A device for monitoring the tension between a first and a second connecting point, the device comprising:
    a first member having a first end to be attached to the first connecting point and a cylindrical projection having a selected diameter extending away from the first end to a second end, the cylindrical projection and the second end of the first member, respectively, defining walls and a base of a cavity, said cavity opening toward the first end and said cavity having a diameter less than said selected diameter and said base of said cavity defining an aperture there-through having a diameter less than said cavity diameter;
    a second member having a first end to be attached to the second connecting point, the second member further defining a cylindrical aperture having a base and a diameter greater than the selected diameter, the cylindrical aperture extending from the base of the aperture to a second end of the second member such that the cylindrical projection of the first member is received by the cylindrical aperture with a sliding fit;
    a compression member received by the cavity defined in the first member; and
    a connecting member extending between the base of the cylindrical aperture of the second member, through said aperture in said base of said cavity of said first member and through said compression member securing the first member to the second member, the compression member and the connecting member arranged between the first member and the second member such that tension between the first connecting point and the second connecting point may be set to a selected value by compressing the compression member a selected amount and thereby changing a distance and resulting tension between the first end of the first member and the first end of the second member, and such that an unintended change in the tension from the selected value will result in an observable change of the distance between the first end of the first member and the first end of the second member.

2. The device of claim 1, wherein the distance between the first and second members is indicated by indicia associated with one or both of the first and second members.

3. The device of claim 1, wherein the compression member comprises at least one spring disk.

4. The device of claim 1, wherein the connecting member comprises an elongated threaded member.

5. The device of claim 4, wherein the connecting member further comprises a matching nut for cooperating with said elongated threaded member.

6. The device of claim 4, wherein the elongated threaded member is received by a threaded and tapped hole defined in the base of cylindrical aperture of the second member of the device.

7. The device of claim 1, wherein the compression member comprises a plurality of stacked spring disks.

8. The device of claim 1, further comprising a spring bracket that is also received by the cavity and that covers the compression member.

9. The device of claim 8, wherein the connecting member comprises a threaded bolt and matching nut.

10. The device of claim 8, wherein the connecting member comprises a threaded bolt and the base of the cylindrical aperture of the second member further defines a threaded and tapped hole for receiving the threaded bolt.

11. The device of claim 1, wherein the connecting member comprises a threaded bolt and matching nut, the second member further defines a hole in the base of the cylindrical aperture and wherein the apertures in the base of said cavity and the hole in the base of the cylindrical aperture receive said threaded bolt there-through.

12. The device of claim 1, wherein the distance between the first and second members is indicated by indicia located on an outside surface of the cylindrical projection and wherein the location of the second end of the second member with respect to the indicia on the outside surface of the projection corresponds to the tension that exists between the first and second connecting points.

13. The device of claim 1, wherein the connecting member comprises a threaded projection integral with the second member and extending away from the first end of the second member, the threaded projection cooperating with a matching nut.

14. The device of claim 1, wherein the first end of the first member and the first end of the second member each define one of a clevis portion or a spade portion for connecting to one of the connecting points.

15. A device for monitoring the tension between a first and a second connecting point, the device comprising:
    a first member having a first end to be attached to the first connecting point and a cylindrical projection having a selected diameter extending away from the first end to a second end, the cylindrical projection and the second end of the first member respectively defining the walls and base of a cavity said cavity opening toward the first end and said cavity having a diameter less than said selected diameter and said base defining an aperture there-through having a diameter less than said cavity diameter;
    a second member having a first end to be attached to the second connecting point, the second member further defining a cylindrical aperture having a base and a diameter larger than the selected diameter, the cylindrical aperture extending from the base of the aperture to a second end of the second member such that the cylindrical projection of the first member is received by the cylindrical aperture with a sliding fit;
    a compression member;
    a spring bracket for covering the compression member, wherein the compression member and the spring bracket are received by the cavity defined in the first member; and
    a connecting member extending between the base of the aperture of the second member through said aperture in said base of said cavity of said first member and through said compression member securing the first member to the second member, the compression member and the connecting member arranged between the first member and the second member such that tension between the first connecting point and the second connecting point may be set to a selected value by compressing the compression member a selected amount thereby changing a distance and resulting tension between the first end of the first member and the first end of the second member, such that an unintended change in the tension from the selected value will result in an observable change of a distance between the first end of the first member and the first end of the second member as indicated by indicia associated with one or both of the first and second members.

16. The device of claim 15, wherein the connecting member comprises a threaded bolt and matching nut.

17. The device of claim 15, wherein the distance between the first and second members is indicated by indicia located on an outside surface of the cylindrical projection of the first member and wherein the location of the second end of the second member with respect to the indicia on the outside surface of the projection corresponds to the tension that exists between the first and second connecting points.

18. The device of claim 15, wherein the compression member comprises at least one spring disk.

19. The device of claim 15, wherein the compression member comprises a plurality of stacked spring disks.

20. The device of claim 15, wherein the connecting member comprises a threaded bolt and the base of the cylindrical aperture of the second member further defines a threaded and tapped hole for receiving the threaded bolt.

* * * * *